Patented Aug. 16, 1932

1,872,512

UNITED STATES PATENT OFFICE

MAX Y. SEATON, OF PALO ALTO, CALIFORNIA, ASSIGNOR TO CALIFORNIA CHEMICAL CORPORATION, OF NEWARK, CALIFORNIA, A CORPORATION OF ILLINOIS

PREPARATION OF HIGH PLASTIC LIME

No Drawing.   Application filed June 24, 1930. Serial No. 463,574.

In the preparation of lime particularly for plaster-finish work in building construction, magnesian limestones have been relied upon, and the finishing limes of the United States center around the dolomitic limes of the mid-west section. The characteristic of this lime is its plastic property, allowing troweling and finishing to a smooth even surface where operating on a large area of work. The relatively high proportion of magnesium oxide contained in these limes has been generally credited with being the fundamental factor in their desirable plasticity. Lime burned from limestone containing less magnesium carbonate in other sections of the country has in fact shown very inferior properties in this respect, and efforts to produce a high-plactic lime from a material without a very substantial magnesia content have been considered futile. In accordance with the present invention however, a high-plastic lime may be had from a substantially pure calcium carbonate source, and affording in fact even higher plasticity than has ever been realized with the dolomitic base raw material, while at the same time obviating the disadvantages of a magnesia content.

To the accomplishment of the foregoing and related ends, the invention, then, consists of the features hereinafter fully described, and particularly pointed out in the claims, the following description setting forth in detail certain embodiments of the invention, these being illustrative however of but a few of the various ways in which the principle of the invention may be employed.

In proceeding in accordance with the invention, I subject a high calcium carbonate material to calcination at materially higher temperatures than are required for releasing the carbon dioxide content. While the process is applicable to a high calcium carbonate of various sources, I preferably operate upon material from the shell deposits of San Francisco Bay, Califirnia. This material when washed free from initial impurities analyzes on the average, calcium carbonate 98.10 per cent., magnesium carbonate 1.50 per cent., silica 0.10 per cent., iron and aluminum oxides, including phosphate, 0.15 per cent., and organic matter and undetermined, 0.15 per cent. A low magnesium carbonate content and a particularly low silica content constitute favorable features.

In calcining, as indicated, my process employs a high range of temperature as contrasted with the practice heretofore. Instead of calcining at a range up to about 1200° C., I operate at a temperature range of around 1400° C. to 1700° C. This can not be satisfactorily accomplished in lime-burning kilns of customary type, and in fact, I prefer to avoid contact of the calcining material with a siliceous liner surface. In my preferred practice, I calcine the material while in contact with liner surfaces of periclase. The precise detail of the kiln otherwise may vary, and where operating upon shell, the rotary type kiln is desirable. Heating may be effected by suitable high temperature-providing means, electric, oil, gas or the like. In calcining under such conditions, temperatures far above those causing reaction between the lime and ordinary silicate refractories are encountered, and even thermo-couples mantled with silicate compounds, such as the customary artificial sillimanite, mullite, etc., are not applicable, and optical temperature indication methods must be employed. In the avoidance of siliceous kiln linings, while periclase is, as stated, a preferable material, such substances as carborundum brick, magnesite brick, chrome brick, and the like, may be used less desirably.

The produce of calcination of a high calcium carbonate material by treating at temperatures materially above those employed in release of carbon dioxide, exhibits markedly characteristic properties. Whereas, when made up to a test putty, high calcium limes heretofore available have shown a "putty volume" range of 3.5 or slightly more cu. ft. per barrel, my product shows a putty volume of 8.0 cu. ft. per barrel of 180 lbs. Again, when tested according to the methods of the American Society for Testing Materials (Standard Specifications for Hydrated Lime for Structural Purposes, A. S. T. M. Standards, 1927, Part II, page 47), plasticity figures of around 650 and more are shown. High calcium limes available heretofore when similarly tested run only slightly over 150. In fact this is a higher plasticity factor than is ordinarily shown by the best available commercial magnesian limes. It has the further advantage of a negligible magnesia content and an insignificant silica content, analysis running in the case of a calcined product from the San Francisco Bay carbonate, about 0.9 per cent. or less of MgO and 0.2 per cent. or less of $SiO_2$. The actual CaO content in any case runs above 90 per cent.

Other modes of applying the principle of the invention may be employed, change being made as regards the details described, provided the features stated in any of the following claims, or the equivalent of such, be employed.

I therefore particularly point out and distinctly claim as my invention:—

1. A process of making a high-plastic lime, which comprises heating calcium carbonate substantially free from silica to a temperature materially above 1200° C.

2. A process of making a high-plastic lime, which comprises heating calcium carbonate substantially free from silica to a temperature of 1400–1700° C.

3. A process of making a high-plastic lime, which comprises heating calcium carbonate to a temperature of 1400–1700° C. while avoiding contact with siliceous surfaces.

4. A process of making a high-plastic lime, which comprises heating calcium carbonate material from San Francisco Bay shell deposits in the substantial absence of silica to a temperature of 1400–1700° C.

5. A process of making a high-plastic lime, which comprises heating calcium carbonate material from San Francisco Bay shell deposits to a temperature of 1400–1700° C.

Signed by me this 17th day of June, 1930.

MAX Y. SEATON.